US012354770B2

(12) United States Patent
Chen

(10) Patent No.: US 12,354,770 B2
(45) Date of Patent: Jul. 8, 2025

(54) FLEXIBLE FLAT CABLE

(71) Applicant: Ying Hao Technology CO., LTD., New Taipei (TW)

(72) Inventor: Chih-Jung Chen, New Taipei (TW)

(73) Assignee: Ying Hao Technology CO., LTD., New Taipei (TW)

( * ) Notice: Subject to any disclaimer, the term of this patent is extended or adjusted under 35 U.S.C. 154(b) by 134 days.

(21) Appl. No.: 18/186,153

(22) Filed: Mar. 18, 2023

(65) Prior Publication Data

US 2023/0352209 A1 Nov. 2, 2023

(30) Foreign Application Priority Data

Apr. 29, 2022 (TW) ................................ 111204464

(51) Int. Cl.

| | |
|---|---|
| ***H01B 7/08*** | (2006.01) |
| ***H01B 19/04*** | (2006.01) |
| *H01B 3/44* | (2006.01) |

(52) U.S. Cl.

CPC ......... *H01B 7/0861* (2013.01); *H01B 7/0823* (2013.01); *H01B 19/04* (2013.01); *H01B 3/447* (2013.01)

(58) Field of Classification Search

CPC .......... H01B 3/447; H01B 7/08; H01B 7/009; H01B 7/0861; H01B 7/0823; H01B 7/0838; H01B 7/18; H01B 7/295; H01B 7/34; H01B 19/04

USPC .................................. 174/36, 102 R–117 FF

See application file for complete search history.

(56) References Cited

U.S. PATENT DOCUMENTS

| | | | | |
|---|---|---|---|---|
| 4,185,162 A * | 1/1980 | Bogese | H01B 7/0838 | 174/32 |
| 4,443,657 A * | 4/1984 | Hill | H01B 7/0233 | 174/117 FF |
| 4,475,006 A * | 10/1984 | Olyphant, Jr. | H01B 7/0861 | 174/105 R |
| 5,306,869 A * | 4/1994 | Springer | H01B 7/0861 | 156/53 |
| 8,975,522 B2 * | 3/2015 | Shanai | C09J 177/08 | 174/117 A |
| 10,957,466 B1 * | 3/2021 | Kojima | H01B 7/0861 | |
| 2002/0195266 A1 * | 12/2002 | Yosomiya | H05K 3/281 | 174/117 F |
| 2006/0169481 A1 * | 8/2006 | Stotz | H01B 7/0838 | 174/117 F |
| 2009/0126970 A1 * | 5/2009 | Sasaki | C08J 5/18 | 174/110 SR |

(Continued)

FOREIGN PATENT DOCUMENTS

| | | | | |
|---|---|---|---|---|
| JP | 2005093367 A * | 4/2005 | H01B 7/08 | |
| JP | 2018181565 A * | 11/2018 | H01B 7/08 | |
| WO | WO-9743352 A1 * | 11/1997 | C09J 133/08 | |

*Primary Examiner* — William H. Mayo, III

(74) *Attorney, Agent, or Firm* — Nathan & Associates Patent Agents Ltd.; Menachem Nathan

(57) ABSTRACT

A flexible flat cable includes an upper bonding adhesive layer and a lower bonding adhesive layer bonded together, a plurality of bare wires being sandwiched, an upper metal shielding layer located on an upper side of the upper bonding adhesive layer and adhesively attached to the upper bonding adhesive layer, and a lower metal shielding layer located on a lower side of the lower bonding adhesive layer and adhesively attached to the lower side of the lower bonding adhesive layer.

29 Claims, 10 Drawing Sheets

(56) References Cited

U.S. PATENT DOCUMENTS

| | | | | |
|---|---|---|---|---|
| 2009/0126972 | A1* | 5/2009 | Matsushita | H01B 7/0861 174/113 R |
| 2011/0232938 | A1* | 9/2011 | Kodama | H01B 7/0838 174/117 F |
| 2012/0004335 | A1* | 1/2012 | Hamer | C09J 5/08 521/97 |
| 2013/0043058 | A1* | 2/2013 | Shanai | H01B 7/295 428/354 |
| 2018/0061530 | A1* | 3/2018 | Lee | H01B 3/441 |
| 2020/0161733 | A1* | 5/2020 | Hsiao | H01P 3/082 |
| 2021/0065929 | A1* | 3/2021 | Kojima | H01B 7/0861 |
| 2021/0337632 | A1* | 10/2021 | Ito | H05B 3/54 |
| 2021/0398709 | A1* | 12/2021 | Shi | H01B 7/0823 |
| 2021/0407704 | A1* | 12/2021 | Tsai | H01B 7/0838 |
| 2022/0064500 | A1* | 3/2022 | Morioka | B32B 15/085 |
| 2022/0242099 | A1* | 8/2022 | Morioka | B32B 3/263 |

* cited by examiner

FLEXIBLE FLAT CABLE

CROSS REFERENCE TO RELATED APPLICATIONS

This application claims the priority of Taiwan Patent Application serial No. 111204464, filed Apr. 29, 2022, the disclosure of which is incorporated herein by reference in their entirety.

FIELD OF INVENTION

The present application relates to a flexible flat cable, and particularly to a flexible flat cable that can meet requirements of industries for characteristic impedance and insertion loss and can also satisfy cost considerations.

BACKGROUND OF INVENTION

Data transmission conductor cables developed by current industries can be used to connect two electronic devices or two circuit boards for high-frequency data transmission, such as: flexible flat cables (FFCs) or flexible printed circuit board cables. Flexible printed circuit cable (FPCBs) are single-sided, double-sided, or multi-layer flexible printed circuit cables that can be produced by etching base material coated with copper. The present application is mainly directed to flexible flat cables. Generally, flexible flat cables are made of insulating material layers and extremely thin flat wires, which are pressed by automatic equipment. Flexible flat cables have characteristics of having wires in neat arrangement, large transmission capacity, compact structure, being small in volume, and flexibility, so they can be flexibly applied to various electronic products and used as conductors for data transmission.

When insulating materials and bare transmission wires are combined by being pressed through automatic equipment, the bare transmission wires of flexible flat cables are to be arranged in parallel, and at the time that upper and lower layers of the insulating materials are bonded from upper and lower sides by adhesive layers, the bare transmission wires arrange in parallel are covered therein. As is well known in the industries, the high dielectric constant Dk and high dissipation factor Df of the insulating material layers are likely to cause signal transmission delay and signal attenuation caused by dielectric loss. Therefore, very high requirements are put on the dielectric constant Dk and dissipation factor Df of the insulating material layers adhered to the bare wires (generally, the lower the dielectric constant and dissipation factor is, the less the influence is). In addition, after the upper and lower insulating material layers are bonded together, a metal shielding layer is further attached to the outside of the upper and lower insulating material layers with an adhesive layer to cover the entire flexible flat cable. Generally speaking, the insulating material layers are necessary components for the flexible flat cables, as disclosed in the prior art, such as Method Of Manufacturing Soft Cable (TW200926213), Extruded Flexible Flat Cable (US 2017/0148544 A1), Insulating Film And Flexible Flat Cable (CN107995891 B), and Cable Structure (US 2021/0407704 A1) have all disclosed the structure of a plurality of parallel-arranged bare wires sandwiched by insulating material layers in conventional flexible flat cables. The aforementioned patents that have been published or granted are only for the purpose of listing the insulating material layers in the prior art. This concept can be understood simply by searching this related technical field.

There are many parameters for evaluating the signal transmission characteristics of flexible flat cables, and one of the most important parameters is the insertion loss. Insertion loss refers to a ratio of output power to input power of the flexible flat cable, which represents a remaining ratio of signal loss, and the unit is dB. Under the requirement of a certain length in the industries, it is generally possible to adjust the size of the transmission wires, adjust the dielectric constant of the insulating material layers, adjust the material of the adhesive layers, attach metal shielding layers to outer sides of the insulating material layers, and adjust matching characteristics of the overall structure of the cables to control the insertion loss characteristics of flexible flat cables, and characteristic impedance of the flexible flat cables can also be adjusted.

Property impedance, or called characteristic impedance, is not DC resistance, but a concept in long-distance transmission. The industries generally formulate a characteristic impedance value that meets its needs. Theoretically, if the outside of the is vacuum (dielectric constant value Dk is 1) or air (dielectric constant value Dk is close to 1), there will be no insertion loss or feed-in loss will be so small that it can be ignored. However, this is not the case in reality. In terms of the insulating material layer, among current materials, polytetrafluoroethylene (commonly known as Teflon) has the dielectric constant Dk 2, which is the closest to air. However, due to material properties, Teflon is almost impossible to be bonded, so it cannot be used as an insulating material layer outside the bare wires in the production of the aforementioned flexible flat cables. Generally speaking, the aforementioned flexible flat cable industries mostly use polyethylene terephthalate (commonly known as PET, with a dielectric constant value Dk of 3.4-3.5) as the insulating material layers. However, the dielectric constant Dk limit of the insulating material layer does have a certain impact on the insertion loss and characteristic impedance of the flexible flat cables, which limits the signal transmission performance.

Therefore, with the design of connectors is light, compact, and affordable, it is bound to become the mainstream. Under these requirements, there is indeed a proposal to meet specification requirements of industries for characteristic impedance and insertion loss, and at the same time, it can meet the needs of economic cost considerations and a simplified structure of the flexible flat cable, which is an important issue that this application wants to solve here. Therefore, it is imperative to provide a flexible flat cable to solve the problems of the prior art.

SUMMARY OF INVENTION

The present application provides a flexible flat cable including a plurality of bare wires arranged in parallel and bonded with an upper bonding adhesive layer and a lower bonding adhesive layer such that the bare wires are being sandwiched. An upper metal shielding layer and a lower metal shielding layer are adhesively attached to the outside of the upper and lower bonding adhesive layers through an upper laminating adhesive layer and a lower laminating adhesive layer, respectively.

The present application provides a flexible flat cable including an upper bonding adhesive layer and a lower bonding adhesive layer bonded together, a plurality of bare wires being sandwiched, an upper metal shielding layer located on an upper side of the upper bonding adhesive layer and directly adhesively attached to the upper bonding adhesive layer, and a lower metal shielding layer located on a lower side of the lower bonding adhesive layer and directly attached to the lower side of the lower bonding adhesive layer.

Compared with conventional flexible flat cables using conventional electronic round wires, the flexible flat cable of the present application does not need to be provided with an insulating material layer. The flexible flat cable of the present application is small in size and simplified in structure. It not only can meet the industries requirements for characteristic impedance and insertion loss, but also can better satisfy the important issue of cost considerations of the industries.

In order to make the above-mentioned content of this application more obvious and easy to understand, the following are preferred embodiments in conjunction with the attached drawings, and the detailed description is provided below.

The realization, functional features, and advantages of the embodiments will be further explained in combination with the embodiments and with reference to the accompanying drawings.

DESCRIPTION OF PREFERRED EMBODIMENTS

In order to further understand the features, technical means, and achieved specific functions and objectives of the present invention, more specific embodiments are enumerated, followed by drawings and reference numbers for detailed description as follows.

The following descriptions of the various embodiments refer to the accompanying drawings to illustrate specific embodiments in which the invention may be practiced. The directional terms mentioned in this application, such as "up", "down", "front", "back", "left", "right", "top", "bottom", "horizontal", "vertical", etc., are for orientation only with reference to the attached drawings. Therefore, the directional language used is to illustrate and understand the application, not to limit the application.

Figure 1:
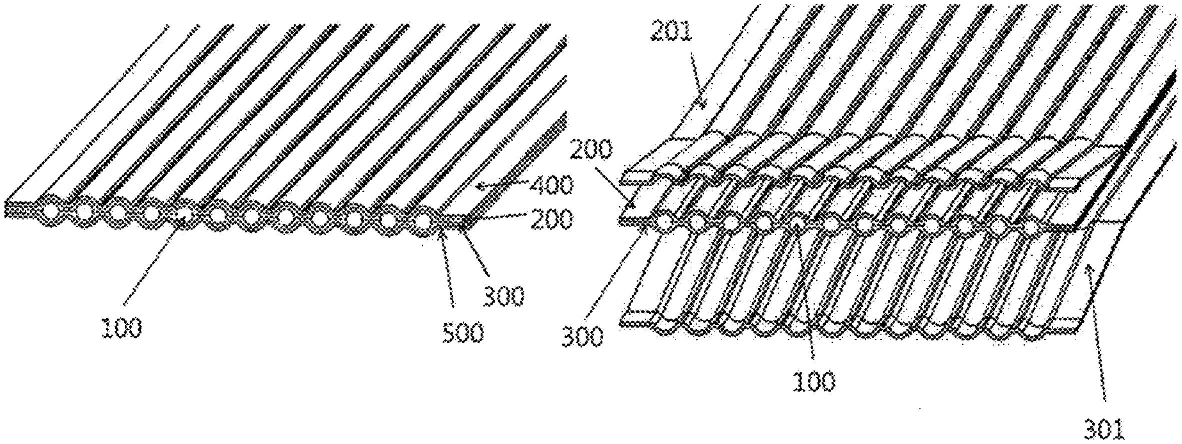
FIG. 1 is a schematic perspective view showing a conventional flexible flat cable on a left part of FIG. 1 and a flexible flat cable in a first embodiment of the present invention on a right part of FIG. 1 when upper and lower metal shielding layers have not been attached.
Figure 2:
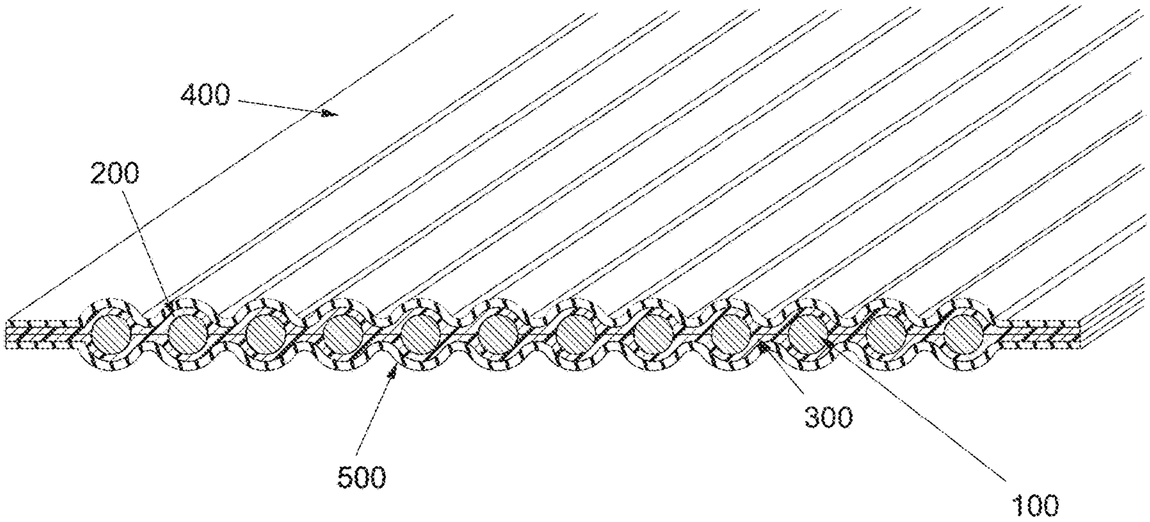
FIG. 2 (Prior Art)
FIG. 2 is a schematic perspective view of a conventional flexible flat cable when upper and lower metal shielding layers have not been attached.
Figure 3:
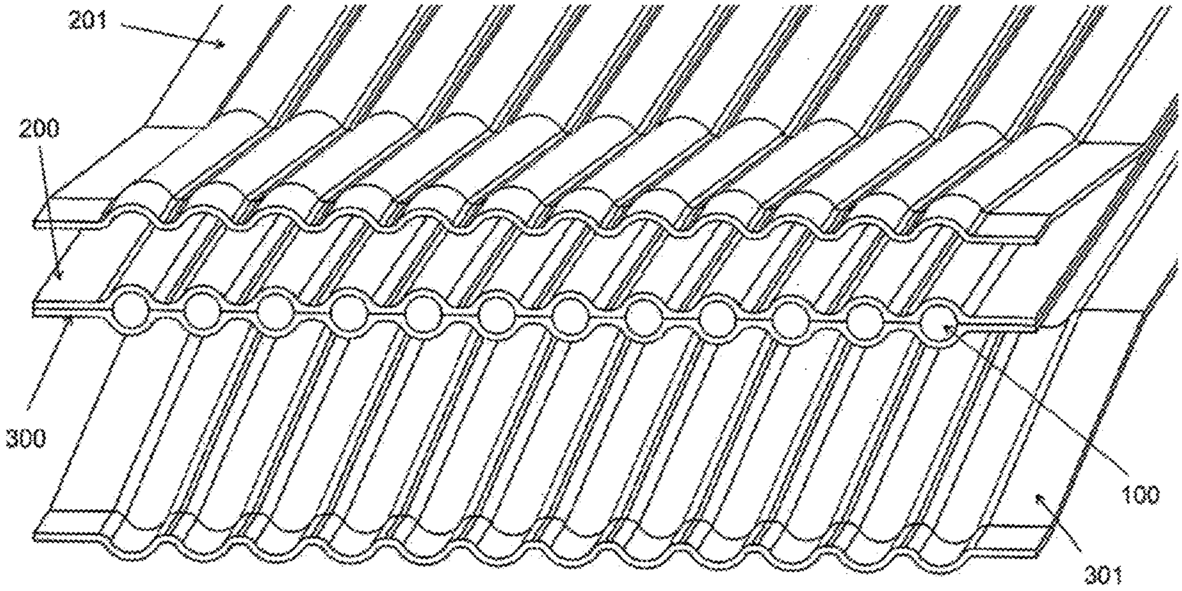
FIG. 3 is a schematic perspective view of the flexible flat cable in the first embodiment of the invention when the upper and lower metal shielding layers have not been attached.

Please refer to FIGS. 1 to 3. FIG. 1 is a schematic perspective view showing a conventional flexible flat cable on a left part of FIG. 1 and a flexible flat cable in a first embodiment of the present invention on a right part of FIG. 1 when upper and lower metal shielding layers have not been attached. FIG. 2 is a schematic perspective view of a conventional flexible flat cable when upper and lower metal shielding layers have not been attached. FIG. 3 is a schematic perspective view of the flexible flat cable in the first embodiment of the invention when the upper and lower metal shielding layers have not been attached. A left part in FIG. 1 is the conventional flexible flat cable. A right part in FIG. 1 is the flexible flat cable in the first embodiment of the present application. Before bonding upper and lower metal shielding layers, the conventional flexible flat cable includes a plurality of bare round wires 100, an upper bonding adhesive layer 200, a lower bonding adhesive layer 300, an upper insulating material layer 400 and a lower insulating material layer 500. Before bonding upper and lower metal shielding layers, the flexible flat cable in the first embodiment of the present application includes a plurality of bare round wires 100, an upper bonding adhesive layer 200, a lower bonding adhesive layer 300, an upper release layer 201, and a lower release layer 301.

In prior art, the upper bonding adhesive layer 200 is attached to the upper insulating material layer 400 first, and the lower bonding adhesive layer 300 is attached to the lower insulating material layer 500 first. Next, the upper insulating material layer 400 and the lower insulating material layer 500 are placed above and below the bare round wires 100, respectively. The upper bonding adhesive layer 200 and the lower bonding adhesive layer 300 face the bare round wires 100, and are hot-pressed with jigs or automatic equipment, so that the bare round wires 100 are press-bonded therein while maintaining a precisely and fixed pitch between adjacent ones of the bare round wires 100.

In the first embodiment of the flexible flat cable of the present application, a certain tension is applied to both sides of the bare round wires 100, so that the fixed pitch between the adjacent ones of the bare round wires 100 can be controlled very precisely and maintained at 0.5 millimeters (mm) as an example. The fixed pitch may be 0.3 mm to 1.0 mm. The upper bonding adhesive layer 200 is firstly formed on the upper release layer 201, and the lower bonding adhesive layer 300 is firstly formed on the lower release layer 301. Next, the upper release layer 201 and the lower release layer 301 are placed above and below the bare round wires 100, respectively. The upper bonding adhesive layer 200 and the lower bonding adhesive layer 300 face the bare round wires 100 and are hot-pressed with jigs or automatic equipment, so that the bare round wires 100 are press-bonded therein while maintaining the precisely and fixed pitch. As shown in FIGS. 1 and 3, after pressing and bonding the bare round wires 100 so that they are sandwiched between the upper bonding adhesive layer 200 and the lower bonding adhesive layer 300, the upper release layer 201 and the lower release layer 301 are peeled off from the upper bonding adhesive layer 200 and the lower bonding adhesive layer 300, with only the upper bonding adhesive layer 200 and the lower bonding adhesive layer 300 left to sandwich the bare round wires 100.

Figure 4:
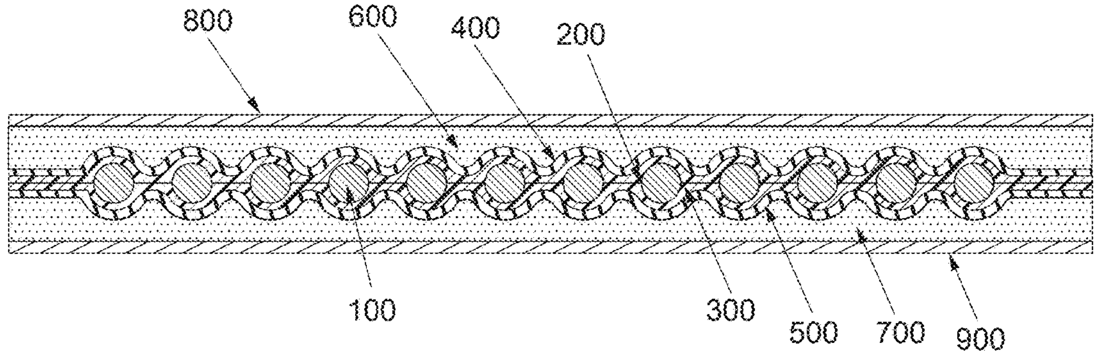
FIG. 4 (Prior Art)
FIG. 4 is a schematic cross-sectional view of a conventional flexible flat cable when upper and lower metal shielding layers are attached.
Figure 5:
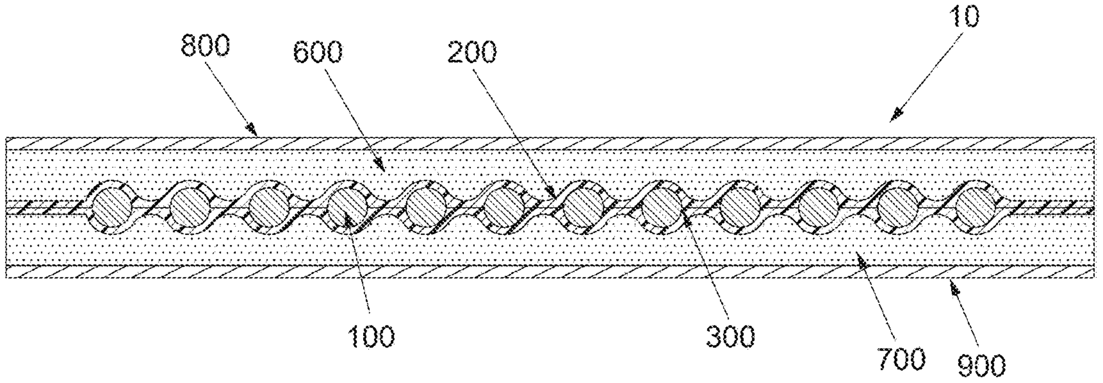
FIG. 5 is a schematic cross-sectional view of the flexible flat cable in the first embodiment of the invention when the upper and lower metal shielding layers are attached.

Please refer to FIGS. 4 and 5. FIG. 4 is a schematic cross-sectional view of a conventional flexible flat cable when upper and lower metal shielding layers are attached. FIG. 5 is a schematic cross-sectional view of the flexible flat cable in the first embodiment of the invention when the upper and lower metal shielding layers are attached. As shown in FIG. 4, in the prior art, an upper metal shielding layer 800 and a lower metal shielding layer 900 are disposed above the upper insulating material layer 400 and below the lower insulating material layer 500, respectively, and press them together with jigs or automatic equipment, so that the upper metal shielding layer 800 and the lower metal shielding layer 900 are adhesively attached to surfaces of the upper insulating material layer 400 and the lower insulating material layer 500 through an upper laminating adhesive layer 600 and an lower laminating adhesive layer 700, thus completing the manufacture of the conventional flexible flat cable.

As shown in FIG. 5, in the first embodiment of the flexible flat cable of the present invention, the upper laminating adhesive layer 600 can be pre-attached to the upper metal shielding layer 800, and the lower laminating adhesive layer 700 can be pre-attached to the lower metal shielding layer 900. Next, the upper metal shielding layer 800 and the lower metal shielding layer 900 are disposed above the upper bonding adhesive layer 200 and below the lower bonding adhesive layer 300, respectively, and press them together with jigs or automatic equipment, so that the upper metal shielding layer 800 and the lower metal shielding layer 900 are adhesively attached to surfaces of the upper bonding adhesive layer 200 and the lower bonding adhesive layer 300 through the upper laminating adhesive layer 600 and the lower laminating adhesive layer 700, thus completing the manufacture of a flexible flat cable 10. The upper laminating adhesive layer 600 and the lower laminating adhesive layer 700 may be laminating adhesive layers with air bubbles. Alternatively, the upper laminating adhesive layer 600 and the lower laminating adhesive layer 700 may be composite laminating adhesive layers with multiple laminating adhesive layers. In this case, the upper laminating adhesive layer 600 or the lower laminating adhesive layer 700 may further include at least one acrylic foam adhesive layer, or may further include at least one laminating adhesive layer with pores, air pockets, or air bubbles mixed with air, as long as it is obtained by chemical manufacturing or mechanical manufacturing. Specifically, the upper laminating adhesive layer 600 or the lower laminating adhesive layer 700 may further include a polyolefin foam layer. In addition, a thickness of each of the upper laminating adhesive layer 600 and the lower laminating adhesive layer 700 is preferably 0.1 mm to 0.4 mm. The upper metal shielding layer 800 and the lower metal shielding layer 900 are preferably aluminum foil layers or copper foil layers.

Furthermore, since the upper bonding adhesive layer 200 and the lower bonding adhesive layer 300 undergo the thermo-compressed bonding to sandwich the bare round wires 100, if the subsequent upper metal shielding layer 800 and the lower metal shielding layer 900 are hot-pressed to adhere to the upper bonding adhesive layer 200 and the lower bonding adhesive layer 300 through the upper laminating adhesive layer 600 and the lower laminating adhesive layer 700, then a melting point of the upper bonding adhesive layer 200 and the lower bonding adhesive layer 300 can be greater than a melting point of the upper laminating adhesive layer 600 and the lower laminating adhesive layer 700. When a method of manufacturing the flexible flat cable is to press and bond the bare round wires 100 with the upper bonding adhesive layer 200 and the lower bonding adhesive layer 300, and then attach the upper metal shielding layer 800 and the lower metal shielding layer 900, a process temperature of hot-pressing can be lower than that of thermo-compression bonding without affecting the stability of the bare round wires 100 sandwiched between the upper bonding adhesive layer 200 and the lower bonding adhesive layer 300. Furthermore, if the subsequent upper metal shielding layer 800 and lower metal shielding layer 900 do not undergo hot-pressing to attach to the upper bonding adhesive layer 200 and the lower bonding adhesive layer 300 through the upper laminating adhesive layer 600 and the lower laminating adhesive layer 700, the aforementioned process temperature considerations are not required.

Certainly, the bare round wires 100, the upper bonding adhesive layer 200, the lower bonding adhesive layer 300, the upper laminating adhesive layer 600, the lower laminating adhesive layer 700, the upper metal shielding layer 800, and the lower metal shielding layer 900 in the present application can all be made into strips for an automatic process operation of rolling out and rolling in, with a single step or multiple steps, to complete the fabrication of the flexible flat cable 10, which will not be repeated here.

Figure 6:
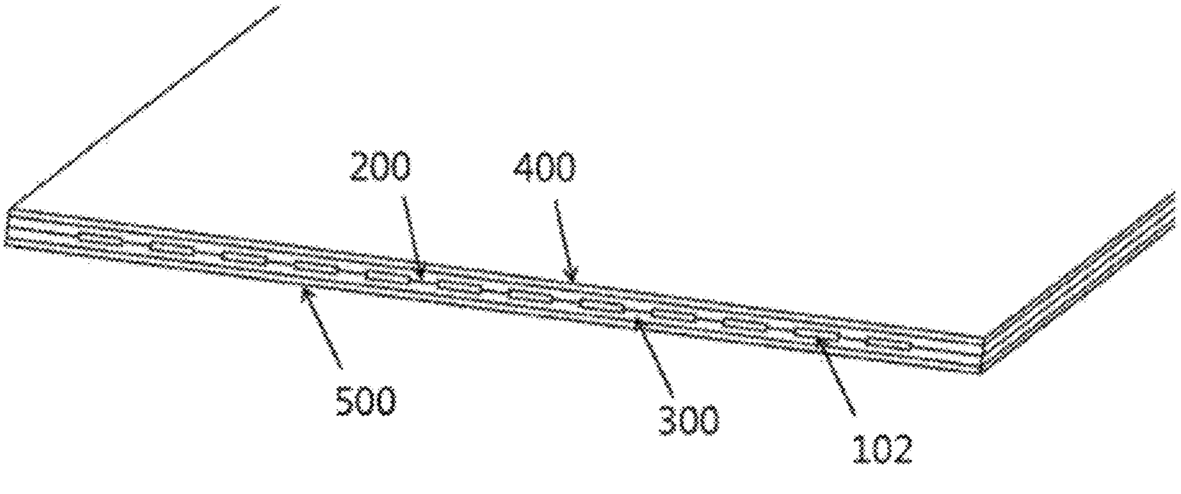
FIG. 6 (Prior Art)
FIG. 6 is a schematic perspective view of a conventional flexible flat cable when upper and lower metal shielding layers have not been attached.
Figure 7:
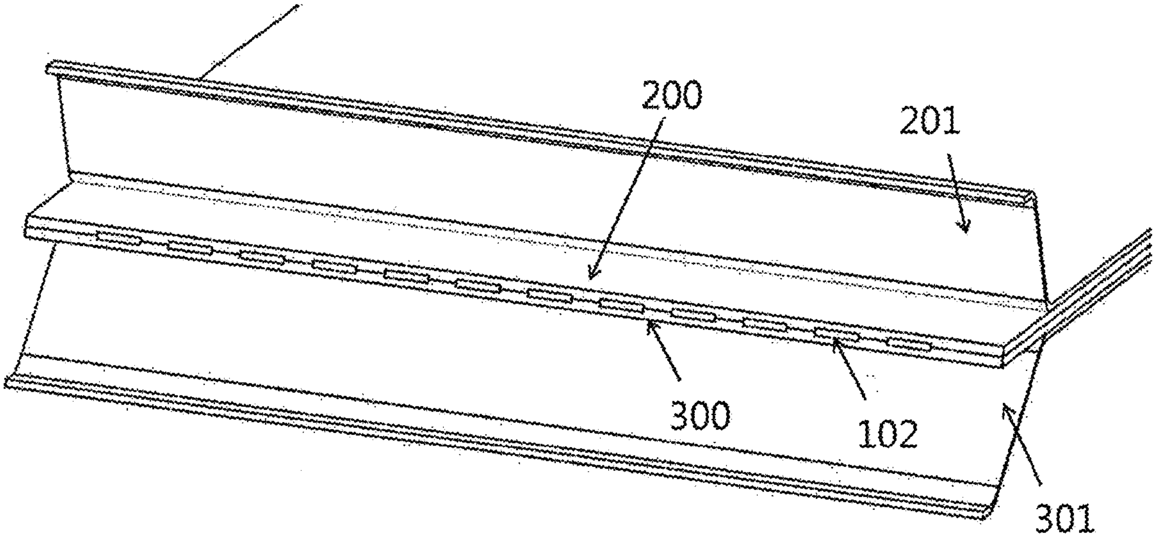
FIG. 7 is a perspective schematic view of a flexible flat cable in a second embodiment of the invention when upper and lower metal shielding layers have not been attached.

Please refer to FIGS. 6 and 7. FIG. 6 is a schematic perspective view of a conventional flexible flat cable when upper and lower metal shielding layers have not been attached. FIG. 7 is a perspective schematic view of a flexible flat cable in a second embodiment of the invention when upper and lower metal shielding layers have not been attached. In this prior art, a difference from the aforementioned prior art is that the conventional flexible flat cable here includes a plurality of bare flat wires 102, that is, a plurality of bare flat wires 102 with a rectangular cross-section as shown in the figure. A difference between the second embodiment of the flexible flat cable of the present invention and the first embodiment is that the second embodiment includes a plurality of bare flat wires 102, an upper bonding adhesive layer 200, a lower bonding adhesive layer 300, an upper release layer 201, and a lower release layer 301.

In the second embodiment of the flexible flat cable of the present application, a certain tension is applied to both sides of the bare round wires 102, so that the fixed pitch between the adjacent ones of the bare round wires 102 can be controlled very precisely and maintained at 0.5 mm as an example. The fixed pitch may be 0.3 mm to 1.0 mm. The upper release layer 201 and the lower release layer 301 are placed above and below the bare round wires 102, respectively. The upper bonding adhesive layer 200 and the lower bonding adhesive layer 300 face the bare round wires 102 and are hot-pressed with jigs or automatic equipment, so that the bare round wires 102 are press-bonded therein while maintaining the precisely and fixed pitch. As shown in FIG. 7, after pressing and bonding the bare round wires 102 so that they are sandwiched between the upper bonding adhesive layer 200 and the lower bonding adhesive layer 300, the upper release layer 201 and the lower release layer 301 are peeled off from the upper bonding adhesive layer 200 and the lower bonding adhesive layer 300, with only the upper bonding adhesive layer 200 and the lower bonding adhesive layer 300 left to sandwich the bare round wires 102.

Figure 8:
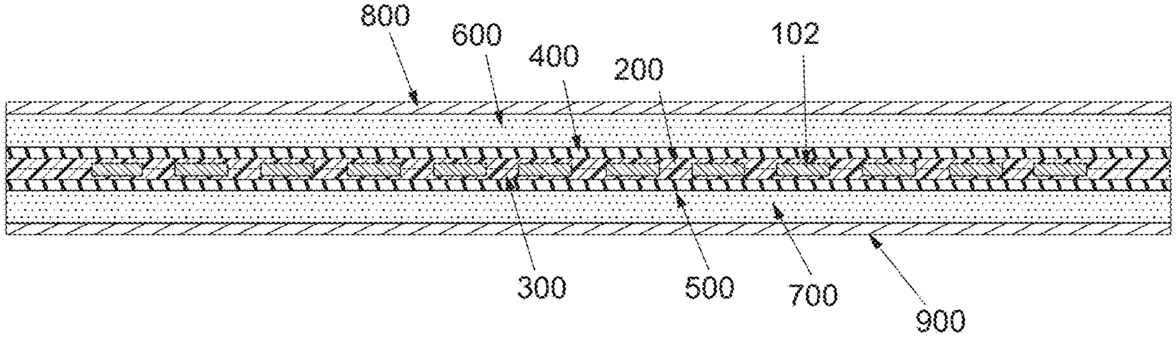
FIG. 8 (Prior Art)
FIG. 8 is a schematic cross-sectional view of a conventional flexible flat cable when upper and lower metal shielding layers are attached.
Figure 9:
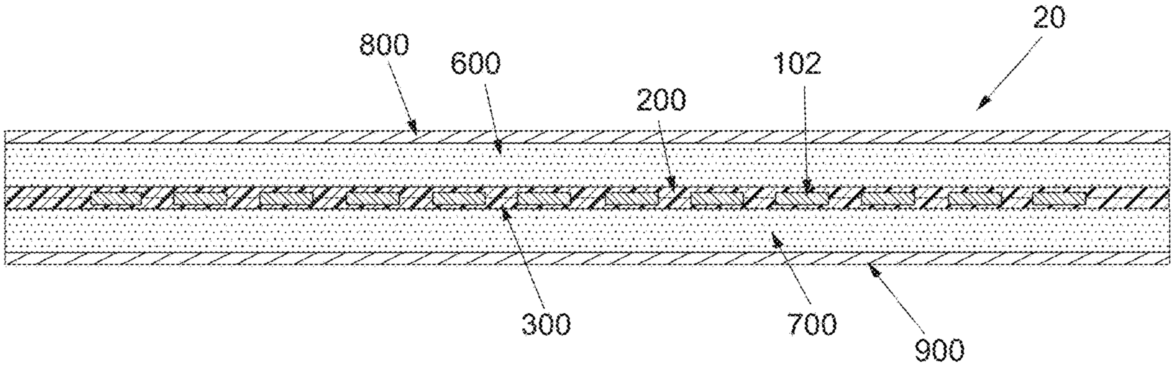
FIG. 9 is a schematic cross-sectional view of the flexible flat cable in the second embodiment of the invention when the upper and lower metal shielding layers are attached.

Please refer to FIGS. 8 and 9. FIG. 8 is a schematic cross-sectional view of a conventional flexible flat cable when upper and lower metal shielding layers are attached. FIG. 9 is a schematic cross-sectional view of the flexible flat cable in the second embodiment of the invention when the upper and lower metal shielding layers are attached. As shown in FIG. 8, in the prior art, the upper metal shielding layer 800 and the lower metal shielding layer 900 are disposed above the upper insulating material layer 400 and below the lower insulating material layer 500, respectively, and press them together with jigs or automatic equipment, so that the upper metal shielding layer 800 and the lower metal shielding layer 900 are adhesively attached to surfaces of the upper insulating material layer 400 and the lower insulating material layer 500 through the upper laminating adhesive layer 600 and the lower laminating adhesive layer 700, thus completing the manufacture of the conventional flexible flat cable.

As shown in FIG. 9, in the second embodiment of the flexible flat cable of the present invention, the upper laminating adhesive layer 600 can be pre-attached to the upper metal shielding layer 800, and the lower laminating adhesive layer 700 can be pre-attached to the lower metal shielding layer 900. Next, the upper metal shielding layer 800 and the lower metal shielding layer 900 are disposed above the upper bonding adhesive layer 200 and below the lower bonding adhesive layer 300, respectively, and hot-pressing them together with jigs or automatic equipment, so that the upper metal shielding layer 800 and the lower metal shielding layer 900 are adhesively attached to surfaces of the upper bonding adhesive layer 200 and the lower bonding adhesive layer 300 through the upper laminating adhesive layer 600 and the lower laminating adhesive layer 700, thus completing the manufacture of a flexible flat cable 20. The upper laminating adhesive layer 600 and the lower laminating adhesive layer 700 may be laminating adhesive layers with air bubbles. Alternatively, the upper laminating adhesive layer 600 and the lower laminating adhesive layer 700 may be composite laminating adhesive layers with multiple laminating adhesive layers. In this case, the upper laminating adhesive layer 600 or the lower laminating adhesive layer 700 may further include at least one acrylic foam adhesive layer, or may further include at least one laminating adhesive layer with pores, air pockets, or air bubbles mixed with air, as long as it is obtained by chemical manufacturing or mechanical manufacturing. Specifically, the upper laminating adhesive layer 600 or the lower laminating adhesive layer 700 may further include a polyolefin foam layer. In addition, a thickness of each of the upper laminating adhesive layer 600 and the lower laminating adhesive layer 700 is preferably 0.1 mm to 0.4 mm. The upper metal shielding layer 800 and the lower metal shielding layer 900 are preferably aluminum foil layers or copper foil layers.

Furthermore, since the upper bonding adhesive layer 200 and the lower bonding adhesive layer 300 undergo the thermo-compressed bonding to sandwich the bare round wires 100, if the subsequent upper metal shielding layer 800 and the lower metal shielding layer 900 are hot-pressed to adhere to the upper bonding adhesive layer 200 and the lower bonding adhesive layer 300 through the upper laminating adhesive layer 600 and the lower laminating adhesive layer 700, then a melting point of the upper bonding adhesive layer 200 and the lower bonding adhesive layer 300 can be greater than a melting point of the upper laminating adhesive layer 600 and the lower laminating adhesive layer 700. When a method of manufacturing the flexible flat cable is to press and bond the bare round wires 100 with the upper bonding adhesive layer 200 and the lower bonding adhesive layer 300, and then attach the upper metal shielding layer 800 and the lower metal shielding layer 900, a process temperature of hot-pressing can be lower than that of thermo-compression bonding without affecting the stability of the bare round wires 100 sandwiched between the upper bonding adhesive layer 200 and the lower bonding adhesive layer 300. Furthermore, if the subsequent upper metal shielding layer 800 and lower metal shielding layer 900 do not undergo hot-pressing to attach to the upper bonding adhesive layer 200 and the lower bonding adhesive layer 300 through the upper laminating adhesive layer 600 and the lower laminating adhesive layer 700, there is no need to consider the aforementioned process temperature.

Certainly, the bare round wires 102, the upper bonding adhesive layer 200, the lower bonding adhesive layer 300, the upper laminating adhesive layer 600, the lower laminating adhesive layer 700, the upper metal shielding layer 800, and the lower metal shielding layer 900 in the present application can all be made into strips for an automatic process operation of rolling out and rolling in, with a single step or multiple steps, to complete the fabrication of the flexible flat cable 20, which will not be repeated here.

Figure 10:
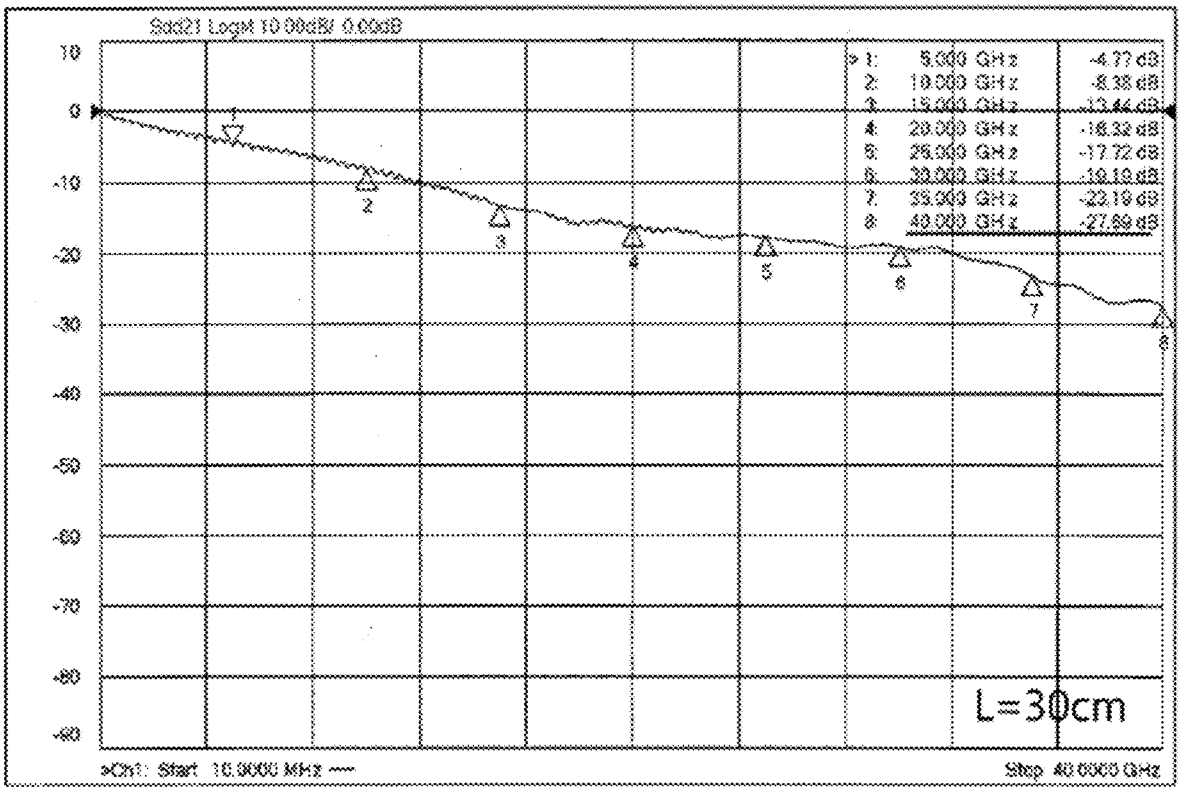
FIG. 10 is an insertion loss detection diagram of a flexible flat cable with a length of 30 centimeters (cm) made according to the second embodiment of the present invention.
Figure 11:
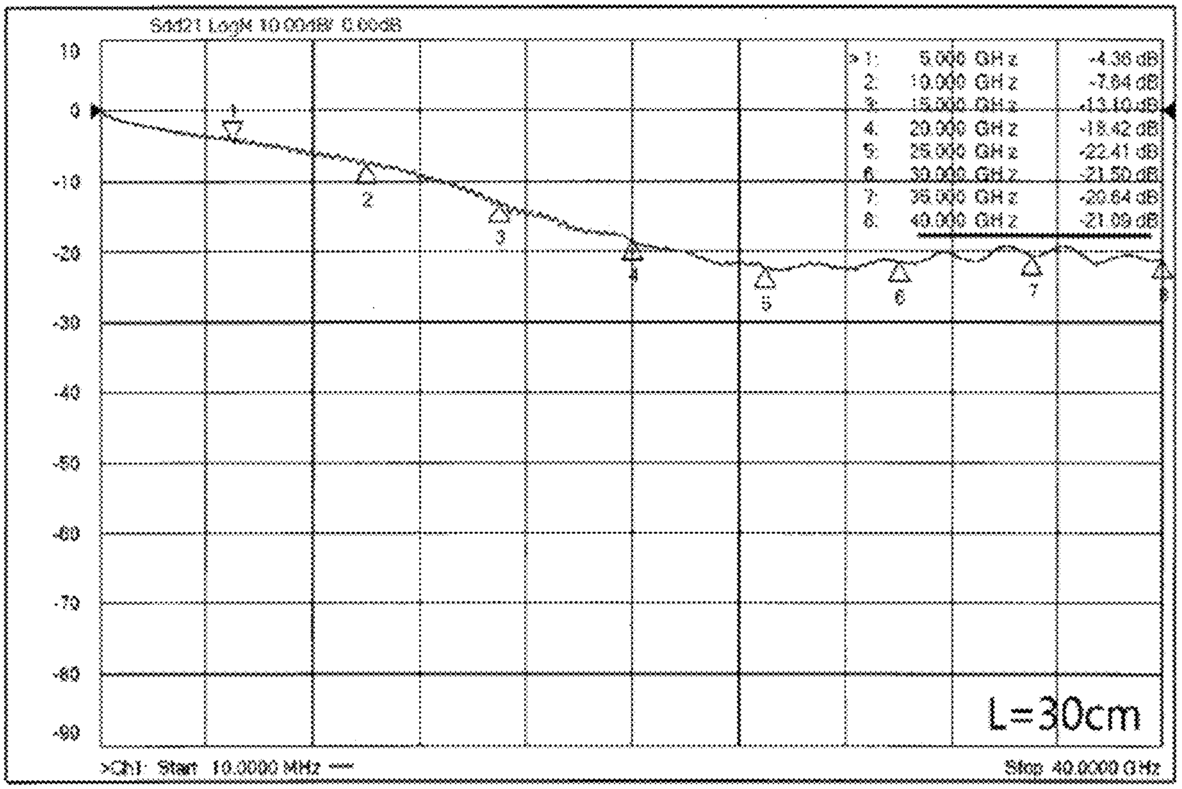
FIG. 11 (Prior Art)
FIG. 11 is an insertion loss detection diagram of a conventional flexible flat cable with a length of 30 cm.
Figure 12:
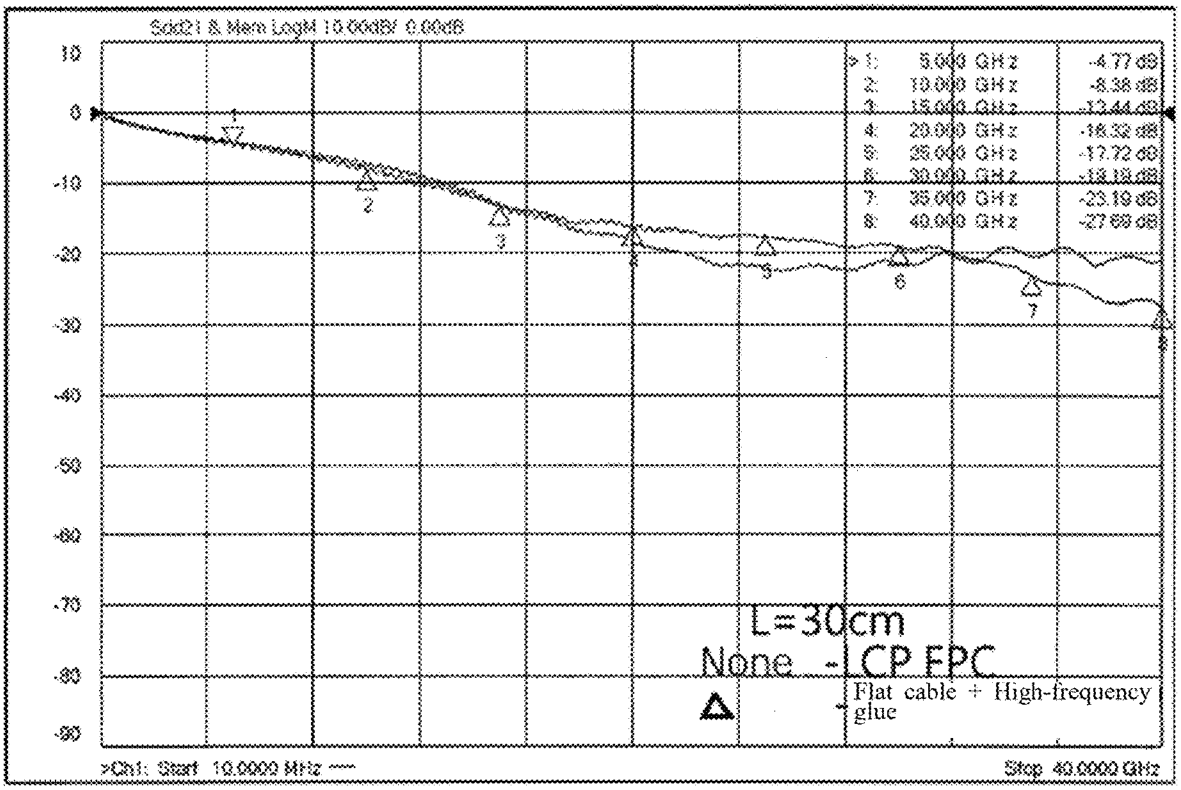
FIG. 12 is a comparison diagram of the insertion loss detection of the flexible flat cables with 30 cm in the prior art and in the present application, respectively.

Please refer to FIGS. 10 to 12. FIG. 10 is an insertion loss detection diagram of a flexible flat cable with a length of 30 centimeters (cm) made according to the second embodiment of the present invention. FIG. 11 is an insertion loss detection diagram of a conventional liquid crystal polymer flexible flat cable (LCP FPC) with a length of 30 cm. FIG. 12 is a comparison diagram of the insertion loss detection of the flexible flat cables with 30 cm in the prior art and in the present application, respectively. The prior art and the second embodiment of the present invention adopt bare flat wires as the signal transmission medium of the flexible flat cable, a width of a single flat wire is 0.3 mm, a pitch between adjacent flat wires is 0.5 mm, and the metal shielding layer is bonded with a laminating adhesive layer with a thickness of 0.025 mm Except that the conventional flexible flat cable has an insulating material layer and the second embodiment of the present invention does not have an insulating material layer, the conventional flexible flat cable and the flexible flat cable in the second embodiment of the present invention have the same basic structures.

As shown in FIG. 10, when a frequency of the transmission signal of the flexible flat cable of the second embodiment of the present invention is increased to 20 gigahertz (GHz), the detected insertion loss is −16.32 decibel (dB); when a frequency of the transmission signal is increased to 40 GHz, the detected insertion loss is −27.69 dB. As shown in FIG. 11, when a frequency of the transmission signal of the conventional flexible flat cable is increased to 20 gigahertz (GHz), the detected insertion loss is −18.42 dB; when a frequency of the transmission signal is increased to 40 GHz, the detected insertion loss is −21.09 dB.

It should be noted that the upper insulating material layer 400 and the lower insulating material layer 500 of the conventional flexible flat cable (LCP FPC) are made of liquid crystal polymer (LCP), so that the flexible flat cable can reflect the insertion loss with such excellent performance values. However, LCP is an extremely expensive material, so the cost of manufacturing this conventional flexible flat cable having such insertion loss performance is very high. In contrast, the present application can exhibit similar insertion loss characteristics and performance under the condition of extremely low production cost.

Figure 13:
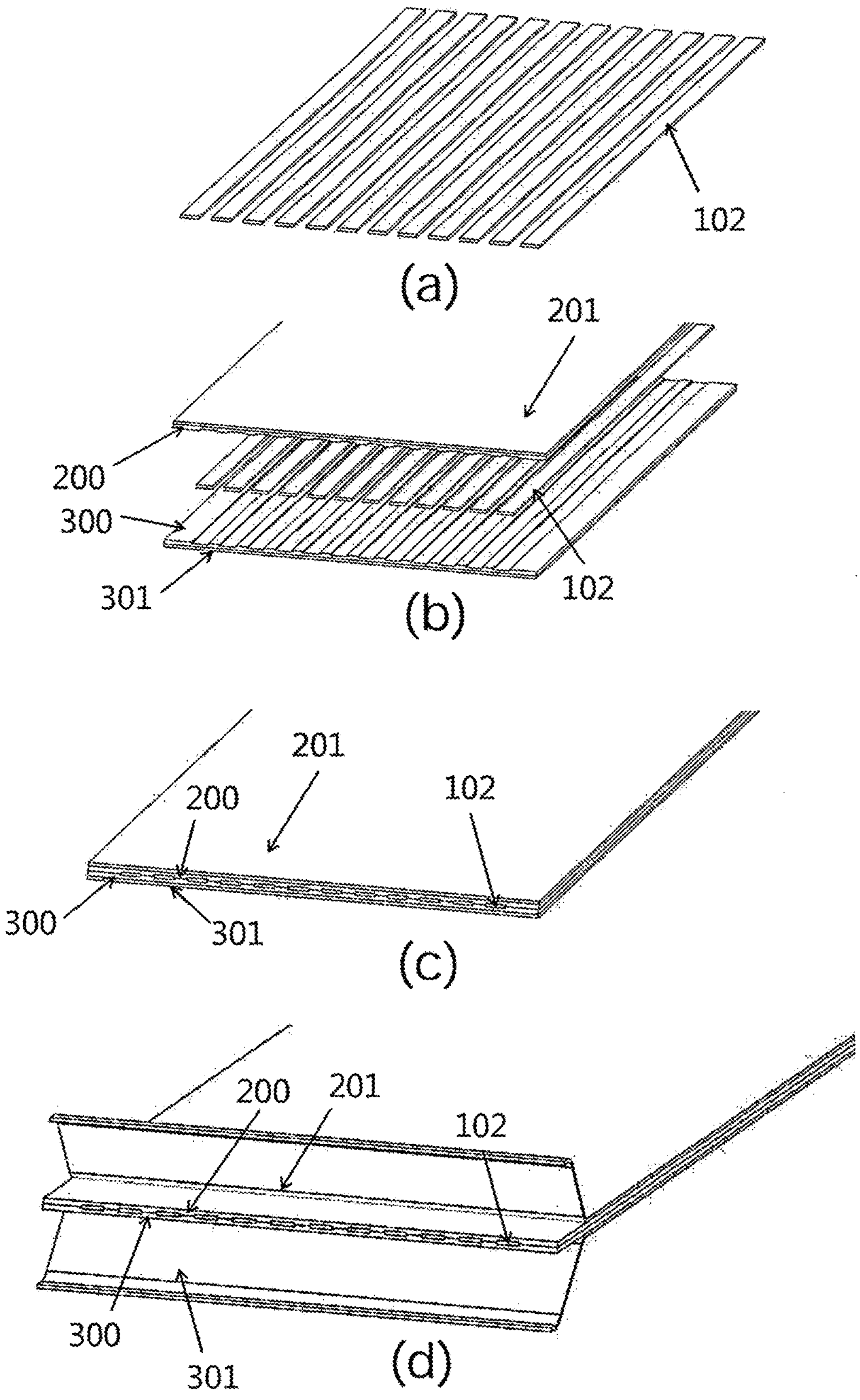
FIG. 13 and FIG. 14 are flow charts of a method of manufacturing the flexible flat cable in the second embodiment of the present invention.
Figure 14:
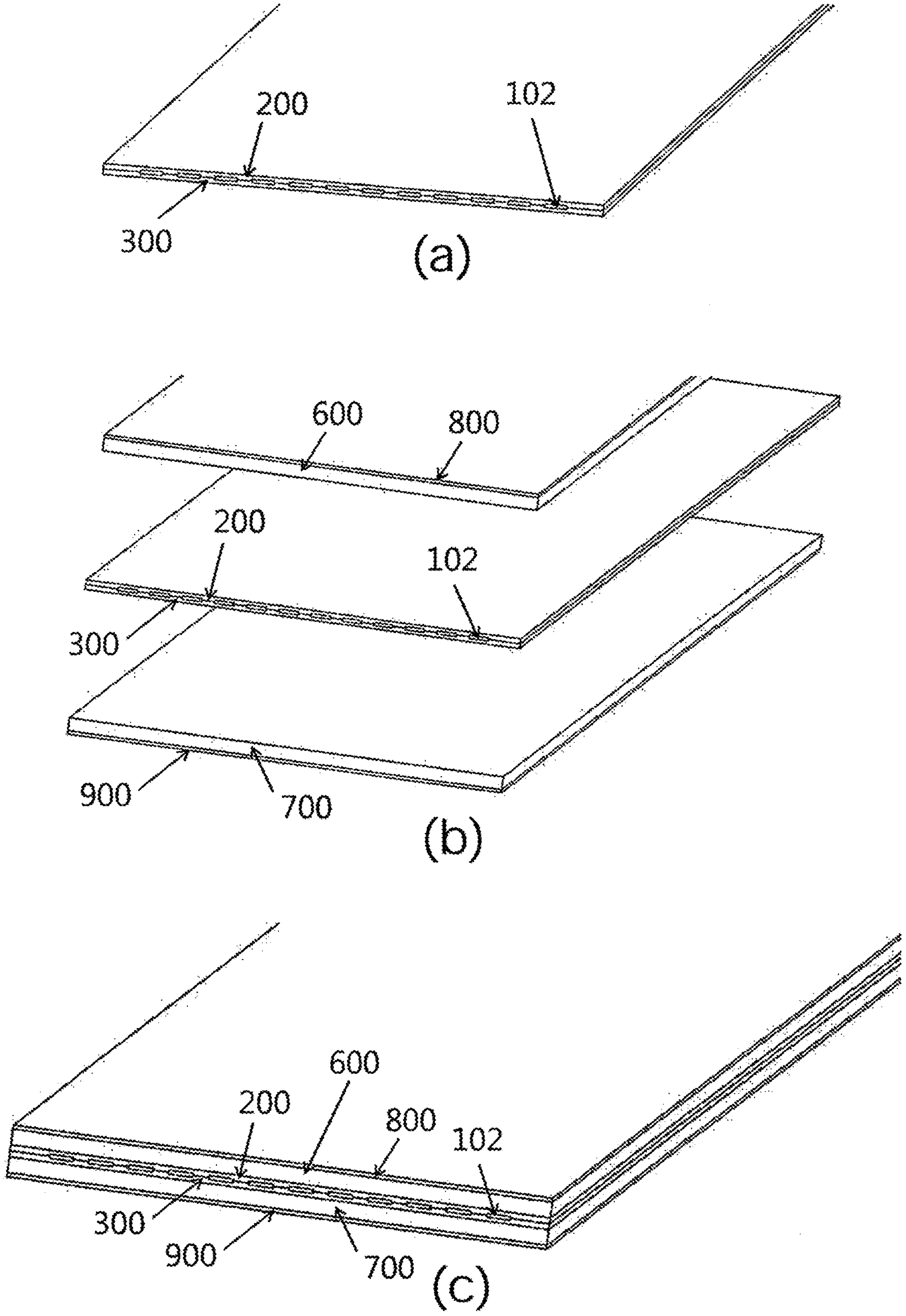

Please refer to FIGS. 13 and 14. FIG. 13 and FIG. 14 are flow charts of a method of manufacturing the flexible flat cable in the second embodiment of the present invention. As shown in FIGS. 13 and 14, the method of manufacturing the flexible flat cable including:

As shown in part (a) of FIG. 13, a plurality of bare wires 102 are provided to be arranged in parallel with a fixed pitch between two adjacent bare wires.

As shown in part (b) of FIG. 13, an upper bonding adhesive layer 200 is provided to be attached to an upper release layer 201 and located on an upper side of the bare wires 102, and a lower bonding adhesive layer 300 is provided to be attached to a lower release layer 301 and located on a lower side of the bare wires 102.

As shown in part (c) of FIG. 13, the upper bonding adhesive layer 200 is bonded to the lower bonding adhesive layer 300 to sandwich the bare wires 102.

As shown in part (d) of FIG. 13, the upper release layer 201 attached to the upper bonding adhesive layer 200 and the lower release layer 301 attached to the lower bonding adhesive layer 300 are peeled separately or at the same time to expose the upper bonding adhesive layer 200 and the lower bonding adhesive layer 300, as shown in part (a) of FIG. 14.

As shown in part (b) of FIG. 14, an upper laminating adhesive layer 600 attached to an upper metal shielding layer 800 and a lower laminating adhesive layer 700 attached to a lower metal masking layer 900 are provided, which are located on an upper side of the upper bonding adhesive layer 200 and below a lower side of the lower bonding adhesive layer 300, respectively.

As shown in part (c) of FIG. 14, the upper laminating adhesive layer 600 is adhesively attached to the upper side of the upper adhesive layer 200, and the lower adhesive layer 700 is adhesively attached to the lower side of the lower adhesive layer 300, thus completing the manufacture of the flexible flat cable of the preset application.

Figure 15:
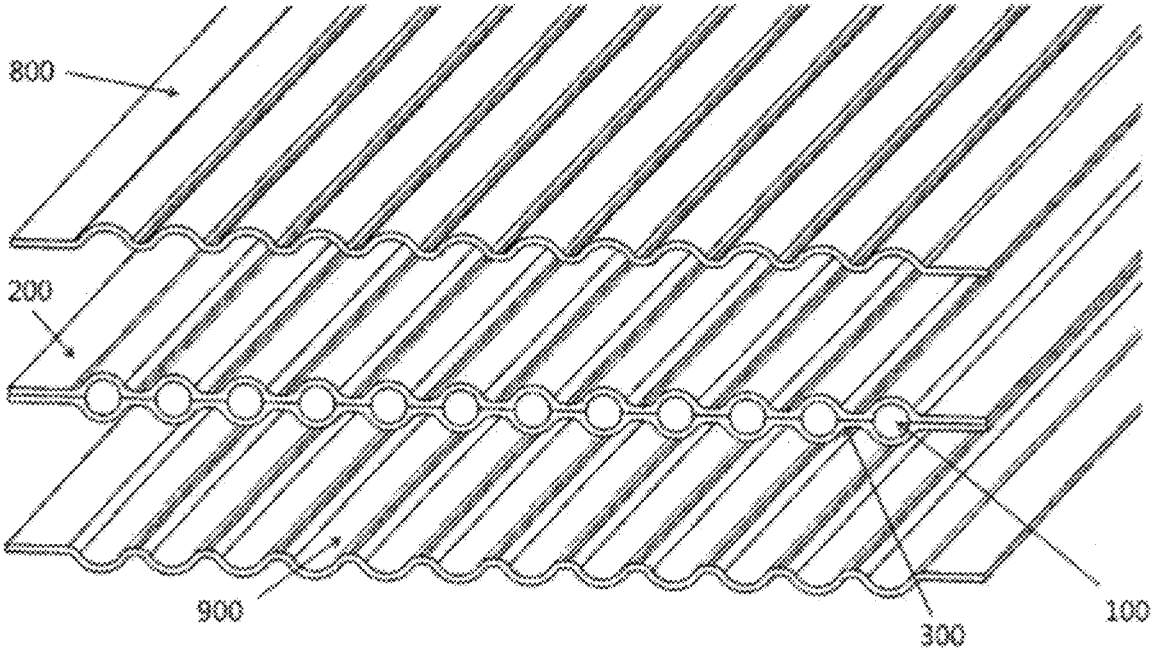
FIG. 15 is a schematic perspective diagram of a flexible flat cable in a third embodiment of the present invention in which upper and lower metal shielding layers are attached to upper and lower bonding adhesive layers.

Please refer to FIG. 15. FIG. 15 is a schematic perspective diagram of a flexible flat cable in a third embodiment of the present invention in which upper and lower metal shielding layers are attached to upper and lower bonding adhesive layers. Furthermore, in the third embodiment of the present invention, the upper laminating adhesive layer 600 and the lower laminating adhesive layer 700 can be selectively omitted. Therefore, as shown in FIG. 15, after the upper release layer 201 and the lower release layer 301 peel off from the upper bonding adhesive layer 200 and the lower bonding adhesive layer 300 as shown in the preceding figures, and only the upper bonding adhesive layer 200 and the lower bonding adhesive layer 300 are left to sandwich the bare flat wires 102, the upper metal shielding layer 800 and the lower metal shielding layer 900 are directly attached to the upper bonding adhesive layer 200 and the lower bonding adhesive layer 300, respectively. In this case, the thickness of the upper bonding adhesive layer 200 and the lower bonding adhesive layer 300 can be properly increased. Moreover, although the bare round wires 100 are taken as an example in FIG. 15, the bare flat wires 102 in the second embodiment can also be applicable to the third embodiment, which will not be reiterated here. If the third embodiment is applied in combination with the method of manufacturing the flexible flat cable as described above, then the step shown in part (b) of FIG. 14 can be skipped. The step shown in part (c) of FIG. 14 is then implemented by attaching the upper metal shielding layer 800 and the lower metal shielding layer 900 directly to the upper bonding adhesive layer 200 and the lower bonding adhesive layer 300, respectively.

Compared with the conventional flexible flat cable using conventional electronic round wires, the flexible flat cable of the present application does not need to be provided with an insulating material layer. The flexible flat cable of the present application is small in size and simplified in structure. It not only can meet the industries requirements for characteristic impedance and insertion loss, but also can greatly reduce the cost, which in turn quite satisfies the important issue of cost considerations of the industries.

Although this application has been disclosed as above with preferred embodiments, it is not intended to limit this application. Anyone who is familiar with this skill can make various changes and modifications without departing from the scope of this application. Therefore, the scope of protection of this application should be defined by the scope of the attached patent claims.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A flexible flat cable, comprising:

a plurality of bare wires, an upper bonding adhesive layer, a lower bonding adhesive layer, an upper laminating adhesive layer, a lower laminating adhesive layer, an upper metal shielding layer, and a lower metal shielding layer;

wherein the bare wires are arranged in parallel with a fixed pitch between two adjacent bare wires, the upper bonding adhesive layer is located on an upper side of the bare wires, the lower bonding adhesive layer is located on a lower side of the bare wires, and the upper bonding adhesive layer and the lower bonding adhesive layer are bonded together, so that the bare wires are being sandwiched, wherein the upper metal shielding layer is located on an upper side of the upper bonding adhesive layer and is adhesively attached to the upper bonding adhesive layer through the upper laminating adhesive layer directly laminated on and in contact with the upper bonding adhesive layer, and the lower metal shielding layer is located on a lower side of the lower bonding adhesive layer and is adhesively attached to the lower bonding adhesive layer through the lower laminating adhesive layer directly laminated on and in contact with the lower bonding adhesive layer;

wherein the upper bonding adhesive layer and the upper laminating adhesive layer are individually provided, the lower bonding adhesive layer and the lower laminating adhesive layer are individually provided, and the upper and lower bonding adhesive layers and the upper and lower laminating adhesive layers are employed as insulating material layers.

2. The flexible flat cable of claim 1, wherein the bare wires are round wires.

3. The flexible flat cable of claim 1, wherein the bare wires are flat wires.

4. The flexible flat cable of claim 1, wherein the fixed pitch of the bare wires ranges from 0.3 millimeters (mm) to 1.0 mm.

5. The flexible flat cable of claim 1, wherein the upper laminating adhesive layer and the lower laminating adhesive layer are laminating adhesive layers with air bubbles.

6. The flexible flat cable of claim 1, wherein the upper laminating adhesive layer or the lower laminating adhesive layer further comprises at least an acrylic foam adhesive layer.

7. The flexible flat cable of claim 1, wherein the upper laminating adhesive layer or the lower laminating adhesive layer further comprises a polyolefin foam layer.

8. The flexible flat cable of claim 1, wherein a thickness of each of the upper laminating adhesive layer and the lower laminating adhesive layer ranges from 0.1 mm to 0.4 mm.

9. The flexible flat cable of claim 1, wherein a melting point of the upper bonding adhesive layer and the lower bonding adhesive layer is greater than a melting point of the upper laminating adhesive layer and the lower laminating adhesive layer.

10. The flexible flat cable of claim 1, wherein the upper metal shielding layer and the lower metal shielding layer are an aluminum foil layer or a copper foil layer.

11. A flexible flat cable, comprising:
- a plurality of bare wires arranged in parallel with a fixed pitch between two adjacent bare wires;
- an upper bonding adhesive layer located on an upper side of the bare wires;
- a lower bonding adhesive layer located on a lower side of the bare wires, wherein the upper bonding adhesive layer and the lower bonding adhesive layer cover the bare wires;
- an upper metal shielding layer attached to an upper side of the upper bonding adhesive layer through an upper laminating adhesive layer, which is directly laminated on and in contact with the upper bonding adhesive layer; and
- a lower metal shielding layer attached to a lower side of the lower bonding adhesive layer through a lower laminating adhesive layer, which is directly laminated on and in contact with the lower bonding adhesive layer, wherein the upper bonding adhesive layer and the upper laminating adhesive layer are individually provided, the lower bonding adhesive layer and the lower laminating adhesive layer are individually provided, and the upper and lower bonding adhesive layers and the upper and lower laminating adhesive layers are employed as insulating material layers.

12. The flexible flat cable of claim 11, wherein the bare wires are round wires.

13. The flexible flat cable of claim 11, wherein the bare wires are flat wires.

14. The flexible flat cable of claim 11, wherein the fixed pitch of the bare wires ranges from 0.3 millimeters (mm) to 1.0 mm.

15. The flexible flat cable of claim 11, wherein the upper laminating adhesive layer is located between the upper metal shielding layer and the upper bonding adhesive layer, and the lower laminating adhesive layer is located between the lower metal shielding layer and the lower bonding adhesive layer.

16. The flexible flat cable of claim 15, wherein the upper laminating adhesive layer and the lower laminating adhesive layer are laminating adhesive layers with air bubbles.

17. The flexible flat cable of claim 15, wherein the upper laminating adhesive layer or the lower laminating adhesive layer further comprises at least an acrylic foam adhesive layer.

18. The flexible flat cable of claim 15, wherein the upper laminating adhesive layer or the lower laminating adhesive layer further comprises a polyolefin foam layer.

19. The flexible flat cable of claim 15, wherein a thickness of each of the upper laminating adhesive layer and the lower laminating adhesive layer ranges from 0.1 mm to 0.4 mm.

20. The flexible flat cable of claim 15, wherein a melting point of the upper bonding adhesive layer and the lower bonding adhesive layer is greater than a melting point of the upper laminating adhesive layer and the lower laminating adhesive layer.

21. The flexible flat cable of claim 11, wherein the upper metal shielding layer and the lower metal shielding layer are an aluminum foil layer or a copper foil layer.

22. A method of manufacturing a flexible flat cable, comprising:
- providing a plurality of bare wires arranged in parallel with a fixed pitch between two adjacent bare wires;
- providing an upper bonding adhesive layer attached to an upper release layer and located on an upper side of the bare wires, and providing a lower bonding adhesive layer attached to a lower release layer and located on a lower side of the bare wires;
- bonding the upper bonding adhesive layer to the lower bonding adhesive layer to sandwich the bare wires;
- peeling off the upper release layer attached to the upper bonding adhesive layer and the lower release layer attached to the lower bonding adhesive layer to expose the upper bonding adhesive layer and the lower bonding adhesive layer;
- providing an upper metal shielding layer and a lower metal shielding layer, which are located on an upper side of the upper bonding adhesive layer and a lower side of the lower bonding adhesive layer, respectively; and
- attaching the upper metal shielding layer to the upper side of the upper bonding adhesive layer through an upper laminating adhesive layer, which is directly laminated on and in contact with the upper bonding adhesive layer, and attaching the lower metal shielding layer to the lower side of the lower bonding adhesive layer through a lower laminating adhesive layer, which is directly laminated on and in contact with the lower bonding adhesive layer.

23. The method of manufacturing the flexible flat cable of claim 22, wherein the bare wires are round wires.

24. The method of manufacturing the flexible flat cable of claim 22, wherein the bare wires are flat wires.

25. The method of manufacturing the flexible flat cable of claim 22, wherein the upper metal shielding layer is pre-attached to the upper laminating adhesive layer, and the lower metal shielding layer is pre-attached to the lower laminating adhesive layer, wherein the upper metal shielding layer is attached to the upper bonding adhesive layer through the upper laminating adhesive layer, and the lower metal shielding layer is attached to the lower bonding adhesive layer through the lower laminating adhesive layer.

26. The method of manufacturing the flexible flat cable of claim 25, wherein a thickness of each of the upper laminating adhesive layer and the lower laminating adhesive layer ranges from 0.1 millimeters (mm) to 0.4 mm.

27. The method of manufacturing the flexible flat cable of claim 25, wherein a melting point of the upper bonding adhesive layer and the lower bonding adhesive layer is greater than a melting point of the upper laminating adhesive layer and the lower laminating adhesive layer.

28. The method of manufacturing the flexible flat cable of claim 25, wherein the upper bonding adhesive layer and the lower bonding adhesive layer are bonded together to sandwich the bare wires through thermo-compression bonding.

29. The method of manufacturing the flexible flat cable of claim 25, wherein the upper laminating adhesive layer attached to the upper side of the upper bonding adhesive layer and the lower laminating adhesive layer attached to the lower side of the lower adhesive layer are implemented by hot-pressing the upper metal shielding layer to the upper bonding adhesive layer through the upper laminating adhesive layer, and hot-pressing the lower metal shielding layer to the lower bonding adhesive layer through the lower laminating adhesive layer, respectively.

* * * * *